Jan. 1, 1924. 1,479,244

A. T. KEIPPER

EGG CARTON

Filed Dec. 30, 1922

Witness:
R. E. Weber

Inventor:
Albert T. Keipper
by
Attorneys

Patented Jan. 1, 1924.

1,479,244

UNITED STATES PATENT OFFICE.

ALBERT T. KEIPPER, OF MILWAUKEE, WISCONSIN.

EGG CARTON.

Application filed December 30, 1922. Serial No. 609,928.

*To all whom it may concern:*

Be it known that I, ALBERT T. KEIPPER, a citizen of the United States, and resident of Milwaukee, in the county of Milwaukee and State of Wisconsin, have invented certain new and useful Improvements in Egg Cartons; and I do hereby declare that the following is a full, clear, and exact description thereof.

My invention relates to an egg carton, such as may be conveniently used for packing eggs in small quantities for the retail trade.

The general object of the invention is to provide a simply constructed and convenient means by which any number of eggs may be packed and securely held against breakage.

My invention will be described in connection with the accompanying drawing, in which—

Figure 1:
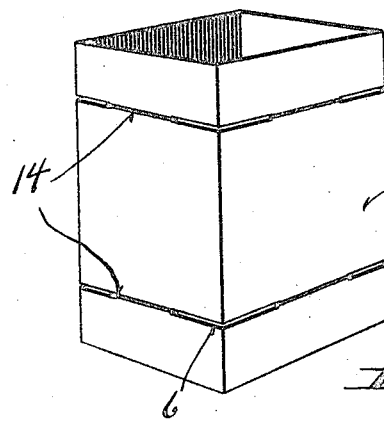
Figure 1 is a perspective view of one of the individual units which constitute my invention.
Figure 2:
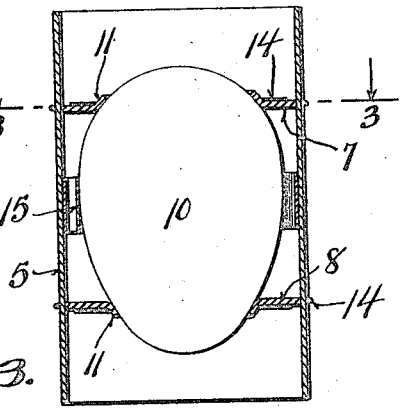
Figure 2 is a vertical sectional view thereof.
Figure 3:
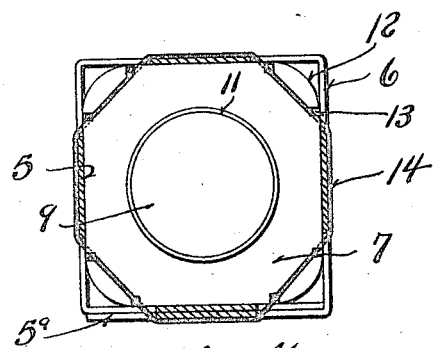
Figure 3 is a sectional plan view taken on the line 3—3 of Figure 2.

In carrying out my invention, each egg is packed in an individual cell 5, which is rectangular in shape and the four side walls of which are preferably formed from a single strip of cardboard, or the like, folded, as illustrated, with four substantially square corners and the ends of the strip overlapping, as shown at 5ª in Figure 3. These lapped portions may, if desired, be secured together by adhesive, but this is not necessary, since the cell unit will be efficiently held in shape by elastic bands, which are hereinafter described. The side walls of the cell are provided with upper and lower series of kerfs 6, which extend in substantially horizontal planes from the corners thereof.

Upper and lower partitions, 7 and 8, are provided which are adapted to fit horizontally within the walls of the cell, and each partition is provided with a central orifice 9, which is adapted to receive one end of the egg 10. The edges of these openings 9 are preferably formed with a flange 11, which fits around the egg and forms a substantial surface for supporting the same. The corners of the partitions are preferably rounded, as shown at 12, and opposite the inner end of each kerf, a notch 13 is formed.

Figure 4:
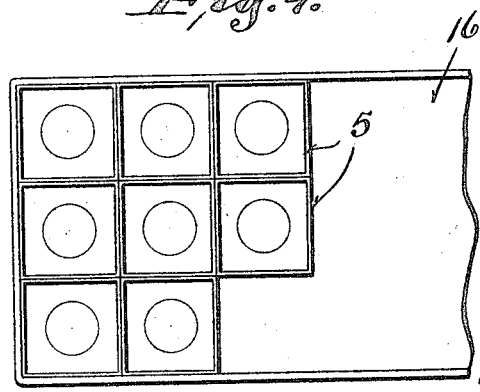
Figure 4 is a plan view showing the manner in which the units are assembled.

When the egg is inserted in the cell, the partitions are placed over the ends thereof, and an elastic cord is then snapped around each end of the cell and into the kerfs 6, passing thru the notches 13, as shown in Figure 4. Preferably a central band 15 is also placed midway of the egg to protect it from side blows. This band may, if desired, be secured to the walls of the cell by adhesive.

After the eggs have been placed in individual cells 5, the latter may be packed snugly into a suitable rectangular container 16, as shown in Figure 4.

From the foregoing description, it will be seen that I have provided a carton which may be furnished in the form of blanks and may be quickly assembled by the person who is packing the eggs. In securing the individual units in their proper position with the egg contained therein, an ordinary rubber band may be used.

It will be also understood that while I have shown and described one specific form in which my invention may be embodied, various changes and modifications may be made in the details thereof without departing from the scope of the invention.

I claim:

1. An individual cell for egg cartons having rectangular side walls and kerfs extending substantially horizontally from the vertical edges thereof near the upper and lower ends of the cell, upper and lower partitions having each a central opening for receiving one end of an egg, notches formed in the edges of said partitions and an elastic band extending thru the notches of each partition and through the corresponding kerfs in the walls to secure said partitions thereto.

2. An egg carton comprising an outer casing, a plurality of individual cells packed within the casing, each cell having four rectangular side walls and upper and lower partitions, each of said partitions having a central opening for receiving one end of an egg, said side walls each having upper and lower kerfs extending from the vertical edges thereof substantially in horizontal planes, and elastic bands extending thru the kerfs and around the cell and engaging the edges of the partitions to removably hold the same in position.

In testimony that I claim the foregoing I have hereunto set my hand at Milwaukee, in the county of Milwaukee and State of Wisconsin.

ALBERT T. KEIPPER.